United States Patent [19]
Dworak et al.

[11] Patent Number: 5,494,956
[45] Date of Patent: Feb. 27, 1996

[54] PROCESS FOR THE PREPARATION OF WATER-DILUTABLE COATING BINDERS AND THEIR USE

[75] Inventors: Gert Dworak; Werner Staritzbichler, both of Graz, Austria; Wolfgang Göldner, Heiligenhaus, Germany

[73] Assignee: Vianova Kunstharz, A.G., Werndorf, Austria

[21] Appl. No.: 182,083

[22] PCT Filed: Jul. 10, 1992

[86] PCT No.: PCT/AT92/00093

§ 371 Date: Mar. 10, 1994

§ 102(e) Date: Mar. 10, 1994

[87] PCT Pub. No.: WO93/01245

PCT Pub. Date: Jan. 21, 1993

[30] Foreign Application Priority Data

Jul. 12, 1991 [AT] Austria .................. 1400/91

[51] Int. Cl.[6] .................. C08L 75/06; C08G 18/80
[52] U.S. Cl. .................. 524/591; 524/839; 524/840; 525/440; 525/454; 528/45; 528/67; 528/71
[58] Field of Search .................. 528/45, 67, 71; 524/591, 839, 840; 525/440, 454

[56] References Cited

U.S. PATENT DOCUMENTS

| | | | |
|---|---|---|---|
| 4,046,729 | 9/1977 | Scriven et al. | 524/591 |
| 4,066,591 | 1/1978 | Scriven et al. | 524/840 |
| 4,147,679 | 4/1979 | Scriven et al. | 524/839 |
| 4,608,413 | 8/1986 | Nachtkamp et al. | 524/840 |
| 4,623,416 | 11/1986 | Henning et al. | 524/840 |
| 4,645,817 | 2/1987 | Probst et al. | 528/45 |
| 4,925,885 | 5/1990 | Rosthauser et al. | 524/591 |
| 5,075,372 | 12/1991 | Hille | 524/840 |
| 5,294,665 | 3/1994 | Pedain et al. | 524/591 |
| 5,326,815 | 7/1994 | Serdiuk et al. | 524/591 |

*Primary Examiner*—James J. Seidleck
*Assistant Examiner*—Rabon Sergent
*Attorney, Agent, or Firm*—Breiner & Breiner

[57] ABSTRACT

The invention relates to a process for producing water-dilutable varnish binders and their use in manufacturing water-dilutable fillers for automobile paintwork. The binders contain a reaction product, which is dilutable with water after the neutralization of the carboxyl groups, of a polyurethane resin having carboxyl groups and at least one terminally blocked isocyanate group (polycarboxyl component) with a polyester having a hydroxyl group (polyhydroxyl component) and a cross-linking component. Further improvements in the shelf-life of the varnishes can be attained by specially selecting the binder components and special processing steps for the combination thereof.

10 Claims, No Drawings

PROCESS FOR THE PREPARATION OF WATER-DILUTABLE COATING BINDERS AND THEIR USE

The invention relates to a process for the preparation of water-dilutable coating binders and to their use for formulating stoving enamels, especially water-thinnable fillers for automotive coating.

The binders contain a reaction product of a polyurethane resin containing carboxyl groups and at least one terminal, blocked isocyanate group (polycarboxyl component) with a polyester carrying hydroxyl groups (polyhydroxyl component), which product is water-dilutable after neutralization of the carboxyl groups, and a crosslinking component.

Binder combinations comprising a polycarboxyl component, a polyhydroxyl component and a crosslinking component are described, for example, in AT Patent 328 587, AT Patent 388 738, AT Patent 388 382 and in EP-A2-0 330 139.

The use of such binder combinations achieves rheological properties, in the coating materials, which are advantageous for application, and achieves a very good adhesive strength of the baked coating films to a metallic substrate or to a primer and in relation to subsequent coats, thus enabling the formulation of high-quality, water-thinnable fillers, as are used by the motor-vehicle industry.

The requirements placed on water-thinnable fillers by users in industry are subject to continual changes, and great efforts are required to provide products which can be employed completely, or almost, universally.

Surprisingly it has now been found that, by making a specific selection of the binder components and by specific process steps for the combination of these binder components, it is possible to achieve further improvements in the storage stability of the coating materials.

The present invention accordingly relates to a process for the preparation of water-dilutable coating binders which contain a reaction product of a polycarboxyl component with a polyhydroxyl component and contain a crosslinking component, which process is characterized in that (A) from 10 to 80 % by weight, preferably from 15 to 40% by weight, of a polyurethane resin which contains carboxyl groups corresponding to an acid number of from 70 to 160 mg of KOH/g and contains, in the molecule, at least one terminal blocked isocyanate group but neither free hydroxyl groups nor fatty acid radicals having more than 12 C atoms, and has an intrinsic viscosity of from 6.5 to 12.0 ml/g, preferably from 8.0 to 11.0 ml/g, measured in N,N-dimethylformamide (DMF) at 20° C., are reacted with (B) from 20 to 90 % by weight, preferably from 60 to 85% by weight, of a polyester resin which may be urethane-modified and has a hydroxyl number of from 50 to 500 mg of KOH/g, an acid number of less than 20 mg of KOH/g and an intrinsic viscosity of from 8.0 to 13.0 ml/g, preferably from 9.5 to 12.0 ml/g, measured in N,N-dimethylformamide (DMF) at 20° C. at a temperature of between 90° and 170° C., preferably at a temperature which is from 10° to 20° C. above the temperature at which the blocking agent for the terminal isocyanate groups of component (A) is eliminated, up to an intrinsic viscosity of from 13.5 to 18.0 ml/g, preferably from 14.5 to 16.5 ml/g, measured in N,N-dimethylformamide (DMF) at 20° C., without exceeding the limit of solubility in water, and subsequently (I) from 60 to 90 % by weight of this reaction product, before or after partial or complete neutralization of the carboxyl groups with an inorganic or organic base, but before addition of a significant proportion of water, are mixed at from 40° to 100° C. with (II) from 10 to 40 % by weight of a crosslinking component which is not water-dilutable, and the mixture is diluted with water to a solids content suitable for its further processing, the sums of the percentages for the composition of the combination of (A) and (B) and of (I) and (II), based on solids, being in each case 100.

The invention also relates to the water-dilutable coating binders prepared by the process according to the invention and to their use for formulating water-thinnable stoving enamels, especially for formulating water-thinnable fillers (primer surfacers) for automotive coating.

By an additional, hydrolysis-stable linkage of the polycarboxyl component (A) with the polyhydroxyl component (B), via the urethane group, by the selection of specific raw materials for the polycarboxyl component (A) in order to improve the compatibility of the reaction product (I) with the crosslinking component (II), and by the admixing of the crosslinking component before addition of a significant proportion of water, the stability of the coating materials formulated with the binder combinations prepared according to the invention is substantially increased, which is especially important for their use in industrial coating plants with closed-circuit systems.

In addition to this, the binder combinations may contain larger proportions, in comparison to prior art products, of crosslinking components. When the coating materials are stored no separation of the coating-material components can be determined. The possibility this provides of influencing the reactivity of the coating materials in a broader range may also make it possible to improve the interlayer adhesion of the baked films.

The polyurethane resin which is employed as polycarboxyl component (A) contains, as specific raw material, a dihydroxymonocarboxylic acid and has, in accordance with the claims, carboxyl groups corresponding to an acid number of from 70 to 160 mg of KOH/g and, per molecule, at least one terminal blocked isocyanate group. Furthermore, according to its definition, the polycarboxyl component (A) contains neither hydroxyl groups nor radicals of fatty acids having more than 12 C atoms. The blocking agent is removed at elevated temperature, i.e. at the reaction temperature for linking with the polyhydroxyl component (B). Like the reaction product (I) of (A) and (B), the polycarboxyl component (A) per se is water-dilutable after partial or complete neutralization of the carboxyl groups with a base, preferably with a secondary or tertiary alkyl- or alkanolamine.

The polyurethane resin is obtained in a known manner by reacting a mixture of a polyisocyanate and a partially blocked—by means of monohydroxyl compounds and/or butanone oxime—polyisocyanate with the dihydroxymonocarboxylic acid and optionally with a polyol, the proportions being chosen such that there is on average at least one terminal blocked isocyanate group in the molecule of the polycarboxyl component (A) which is free from hydroxyl groups.

The dihydroxymonocarboxylic acid preferably employed is dimethylolpropionic acid. In principle, other dihydroxymonocarboxylic acids are also suitable.

The polyisocyanate compounds used are principally the commercially available diisocyanates, such as tolylene diisocyanate, isophorone diisocyanate or hexamethylene diisocyanate, and suitable isocyanate prepolymers may also be used.

In order to block the free NCO groups, monohydroxyl compounds, especially monoalcohols, such as 2-ethylhexanol, monoethers of glycols and polyoxyalkylenediols, or butanone oxime, are selected such that, when the polycarboxyl component (A) is reacted with the polyhydroxyl component (B), they are eliminated, i.e. the elimination temperature should be between 80° and, at most, 160° C. The polycarboxyl component (A) has an intrinsic viscosity of from 6.5 to 12.0 ml/g, preferably from 8.0 to 11.0 ml/g, measured in N,N-dimethylformamide (DMF) at 20° C.

The film-forming polyester resins employed as polyhydroxyl component (B) are characterized by a hydroxyl number of from 50 to 500 mg of KOH/g, an acid number of less than 20 mg of KOH/g and an intrinsic viscosity of from 8.0 to 13.0 ml/g, preferably from 9.5 to 12.0 ml/g, measured in N,N-dimethylformamide (DMF) at 20° C. The polyester resins, prepared from polyols and polycarboxylic acids, may optionally contain urethane groups and be modified with monocarboxylic acids containing from 5 to 20 C atoms. However, the proportion of residues of monocarboxylic acids should not exceed 15% by weight Components (A) and (B) are reacted at from 90 to 170° C., preferably at a temperature which is from 10° to 20° C. above the temperature at which the blocking agent for the terminal isocyanate groups in the polycarboxyl component (A) is eliminated, up to an intrinsic viscosity of from 13.5 to 18.0 ml/g, preferably from 14.5 to 16.5 ml/g, measured in N,N-dimethylformamide (DMF) at 20° C.; in this context it should be noted that the reaction product (I) must, after neutralization of the carboxyl groups, still be perfectly dilutable in water. The proportions, based on solids, are from 10 to 80% by weight, preferably from 15 to 40% by weight, for component (A) and from 20 to 90% by weight, preferably from 60 to 85% by weight, for component (B); the sum of the percentages is in each case 100 and they are chosen so that the reaction product (I) has an acid number of at least 25 mg of KOH/g, preferably between 30 and 50 mg of KOH/g.

The reaction product (I) is subsequently, before or after partial or complete neutralization of the carboxyl groups using inorganic or organic bases but before addition of a significant proportion of water, mixed with a crosslinking component (II) which is not water-dilutable, and the mixture is diluted with water to a solids content which is suitable for its further processing.

The commercially available blocked diisocyanates or blocked polyisocyanates preferably employed as crosslinking component (II) should contain proportions of organic solvents which are as low as possible.

To regulate surface hardness and elasticity in the baked coating films it is possible, advantageously, to use two or more blocked di- or polyisocyanates, preferably in combinations of "soft" and "hard" types in a ratio of from 10 to 35% by weight to from 90 to 65% by weight. The term "soft" types refers in particular to those products which are obtained from aliphatic di- or polyisocyanates by biuret formation or oligomerization, for example from hexamethylene diisocyanate. In the case of "hard" types, the di- or polyisocyanates used as starting products contain cycloaliphatic or aromatic hydrocarbon radicals. Examples of such diisocyanates are: tolylene diisocyanate, tetramethylxylylene diisocyanate, diphenylmethane diisocyanate, dicyclohexylmethane diisocyanate and isophorone diisocyanate.

Furthermore, it is also possible to employ water-dilutable blocked polyisocyanates as components of crosslinking component II. Blocked polyisocyanates of this type are preferably admixed after the abovementioned dilution with water.

The bases used for the neutralization of the carboxyl groups of reaction product (I) are preferably secondary or tertiary alkyl- or alkanolamines.

The proportions of reaction product (I) and crosslinking component (II) are from 60 to 90% by weight of (I) and from 10 to 40% by weight of (II), the sum of the percentages being in each case 100.

The coating binders prepared according to the invention are processed further in a known manner. The products are preferably employed as binders for water-thinnable fillers, especially for automotive coating.

The examples illustrate the invention without limiting its scope. All parts and percentages given relate, unless otherwise specified, to units by weight.

The following abbreviations are used in the examples:

| | |
|---|---|
| DGM | diethylene glycol dimethyl ether |
| MIBK | methyl isobutyl ketone |
| TDI | tolylene diisocyanate (commercially available isomer mixture of about 80% 2,4-TDI and about 20% 2,6-TDI) |
| EEW | epoxide equivalent weight |

Preparation of the polycarboxyl components

Component (A1): A solution of 810 parts (6 mol) of dimethylolpropionic acid in 946 parts of DGM and 526 parts of MIBK is placed in a suitable reaction vessel. Simultaneously over 4 hours, a mixture of 870 parts (5 mol) of TDI and 528 parts (2 mol) of a TDI which is semi-blocked with ethylene glycol monoethyl ether is added at 100° C. to this solution. As soon as all the NCO groups have reacted, the batch is diluted to a solids content of 60% with a mixture of DGM and MIBK (2:1). Component (A1) has an acid number of 140 mg of KOH/g and an intrinsic viscosity, measured in N,N-dimethylformamide (DMF) at 20° C., of 9.3 ml/g.

The semi-blocked TDI is prepared by adding 90 parts (1 mol) of ethylene glycol monoethyl ether to 174 parts (1 mol) of TDI over 2 hours at 30° C. and subsequently reacting the mixture until an NCO value of from 16 to 17% is reached.

Component (A2): In the same manner as for (A1), 945 parts (7 mol) of dimethylolpropionic acid in 1079 parts of DGM and 599 parts of MIBK are reacted with 1044 parts (6 mol) of TDI and 528 parts (2 mol) of a TDI semi-blocked with ethylene glycol monoethyl ether. Component (A2) has a solids content of 60%, an acid number of 140 mg of KOH/g and an intrinsic viscosity, measured in N,N-dimethylformamide (DMF) at 20° C., of 10.2 ml/g.

Component (A3): In the same manner as for (A1), a mixture of 348 parts (2 mol) of TDI and 522 parts (2 mol) of a TDI semi-blocked with butanone oxime is added over 4 hours at 100° C. to a solution of 270 parts (2 mol) of dimethylolpropionic acid and 118 parts (1 mol) of hexanediol in 361 parts of DGM and 181 parts of MIBK, and the reaction proceeds until all the NCO groups have reacted. The solids content is then adjusted to 60% with DGM/MIBK (2:1). Component (A3) has an acid number of 89 mg of KOH/g and an intrinsic viscosity, measured in N,N-dimethylformamide (DMF) at 20° C., of 9.7 ml/g.

The semi-blocked TDI is prepared by adding 174 parts (2 mol) of butanone oxime over 2 hours at 30° C. to 696 parts (4 mol) of TDI and subsequently reacting the mixture until an NCO value of from 28 to 29% is reached.

Preparation of the polyhydroxyl components

Component (B1): In a suitable reaction vessel, 130 parts (1.1 mol) of hexane-1,6-diol, 82 parts (0.6 mol) of monopentaerythritol, 8 parts (0.05 mol) of isononanoic acid, 28 parts (0.1 mol) of ricinene fatty acid (dehydrated castor oil fatty acid) and 50 parts (0.3 mol) of isophthalic acid are esterified at 210° C. until an acid number of less than 4 mg of KOH/g is reached. The viscosity of a 50% strength solution in ethylene glycol monobutyl ether, in accordance with DIN 53211/20° C., is 125 seconds, and the intrinsic viscosity, measured in N,N-dimethylformamide at 20° C., is 9.8 ml/g.

Component (B2): In the same manner as for (B1), 38 parts (0.2 mol) of tripropylene glycol, 125 parts (1.2 mol) of neopentylglycol, 28 parts (0.1 mol) of isomerized linoleic acid, 83 parts (0.5 mol) of isophthalic acid and 58 parts (0.3 mol) of trimellitic anhydride are esterified at 230° C. until an acid number of less than 4 mg of KOH/g is reached. The viscosity of a 50% strength solution in ethylene glycol monobutyl ether, in accordance with DIN 53211/20° C., is 165 seconds. The intrinsic viscosity, measured in N,N-dimethylformamide at 20° C., is 10.5 ml/g.

Component (3): 259 parts (1.35 mol) of tripropylene glycol, 8 parts (0.05 mol) of isononanoic acid, 42 parts (0.15 mol) of isomerized linoleic acid, 68.5 parts (0.5 mol) of monopentaerythritol and 175 parts (1.05 mol) of isophthalic acid are esterified in the presence of 0.5 part of dibutyltin dilaurate at 220° C. until an acid number of 4 mg of KOH/g is reached. The viscosity, in accordance with DIN 53211/20° C., of a 70% strength solution in ethylene glycol monobutyl ether is 120 seconds. After dilution with 260 parts of methyl ethyl ketone, 70 parts (0.4 mol) of TDI are added over 3 hours at 70° C. The temperature is maintained until all the NCO groups have reacted. The methyl ethyl ketone is removed in vacuo and subsequently the batch is diluted with methoxypropoxypropanol to a solids content of 93%. The viscosity, in accordance with DIN 53211/20° C., of a 42% strength solution in ethylene glycol monobutyl ether is 58 seconds. The intrinsic viscosity, measured in N,N-dimethylformamide at 20° C., is 12.1 ml/g.

Component (B₄): 259 parts (1.35 mol) of tripropylene glycol, 25 parts (0.15 mol) of isophthalic acid and 97 parts (0.5 mol) of trimellitic anhydride are esterified in the presence of 0.2 part of dibutyltin dilaurate at 220° C. until an acid number of 15 mg of KOH/g is reached. The viscosity, in accordance with DIN 53211/ 20° C., of a 50% strength solution in ethylene glycol monobutyl ether, is 60 seconds. The intrinsic viscosity, measured in N,N-dimethylformamide at 20° C., is 11.4 ml/g.

Preparation of the binder component (I)

In accordance with the proportions given in Table 1, the polycarboxyl component (A) and the polyhydroxyl component (B) are mixed with one another, and the solvent present is largely removed in vacuo while the mixture is heated to the given reaction temperature. This temperature is maintained until the desired acid number and intrinsic viscosity have been reached, when a sample can be perfectly diluted with water after neutralization with dimethylethanolamine. The components are processed further directly in accordance with Examples 1 to 4.

TABLE 1

| | (all quantities relate to solids) | | | | | |
|---|---|---|---|---|---|---|
| Reaction product | Component (A) Parts/Type | | Component (B) Parts/Type | | Reaction temperature[1] | Acid number mg of KOH/g | $[\eta]$ [2] ml/g |
| I/1 | 35 | (A1) | 65 | (B1) | 150–160° C. | 41–45 | 16.7 |
| I/2 | 30 | (A2) | 70 | (B2) | 150–160° C. | 35–39 | 16.0 |
| I/3 | 40 | (A3) | 60 | (B3) | 150–160° C. | 29–32 | 14.9 |
| I/4 | 23 | (A1) | 77 | (B4) | 150–160° C. | 33–37 | 15.8 |

[1]The reaction is carried out in approx. 90% strength solution in DGM
[2]Intrinsic viscosity measured in N,N-dimethylformamide (DMF) at 20° C.

EXAMPLES 1 to 4:

In accordance with the data in Table 2, the reaction product (I) is mixed at from 40° to 100° C. with the crosslinking component (II) and adjusted with dimethylethanolamine to the stated degree of neutralization. It is also possible to neutralize the reaction product (I) before adding the crosslinking component (II). The batch is then diluted with deionized water.

The following crosslinking components (II) are employed:

IC 1  commercially available polyisocyanate (hexamethylene diisocyanate trimer with isocyanurate structure) blocked with butanone oxime, e.g. Desmodur ® N 3390, Bayer.
IC 2  commercially available polyisocyanate (hexamethylene diisocyanate trimer with biuret structure) blocked with butanone oxime, e.g. Desmodur ® N 100, Bayer.

TABLE 2

| | (all quantities relate to solids) | | | |
|---|---|---|---|---|
| Example | Reaction product (I) Parts/Type | Crosslinking component (II) Parts/Type | Degree of neutralization | Solids content after dilution with H₂O |
| 1 | 70/(I/1) | 30/C 1 | 90% | 35% |
| 2 | 65/(I/2) | 35/C 1 | 90% | 35% |
| 3 | 70/(I/3) | 30/C 2 | 95% | 35% |
| 4 | 70/(I/4) | 30/C 2 | 90% | 34% |

Testing the storage stability of a clearcoat based on the binder according to Example 4

The stability was tested using aqueous clearcoats. For comparison, a clearcoat based on Example 3 of EP-A2-0 330 139 was used.

| Composition and characteristics of the clearcoats | | |
|---|---|---|
| Clearcoat | A I | B I |
| Binder according to Example 4/34% | 100 | |
| Binder according to Example 3 of EP-A2-0 330 139/47.6% | | 49.8 |
| Water | — | 22 |
| Neutralizing agent | — | 0.4 |
| Solids content | 34 | 33 |
| Viscosity (P) | 1.2 P | 1.2 P |

The clearcoats are stored in sealed glass bottles at 40° C. The results of the storage tests are compiled in Table 3.

TABLE 3

| Clearcoat | A 1 | B 1 |
|---|---|---|
| at beginning of test | | |
| pH | 8.3 | 8.1 |
| viscosity (P) | 1.2 | 1.2 |
| appearance | slightly milky | slightly milky |
| after 1 week | | |
| pH | 7.9 | — |
| viscosity (P) | 0.9 | — |
| appearance | slightly milky | 2-phase |
| after 2 weeks | | |
| pH | 7.9 | — |

TABLE 3-continued

| Clearcoat | A 1 | B 1 |
|---|---|---|
| viscosity (P) | 0.9 | — |
| appearance | slightly milky | — |
| after 3 weeks | | |
| pH | 7.8 | — |
| viscosity | 0.8 | — |
| appearance | slightly milky | — |

Testing the binders according to the invention as automotive fillers

The binders corresponding to Examples 1 to 4 and to Example 3 of EP-A2-0 330 139 are formulated as automotive fillers.

```
286 parts of binder, 35% strength
 50 parts of titanium dioxide (rutile)
 40 parts of barium sulfate
 10 parts of micronized talc
0.2 part of carbon black pigment
13.8 parts of water
```

The coating materials have a solids content of about 50%, a pH of about 8.0 (adjusted using dimethylethanolamine) and a viscosity of about 1.2 P/20° C.

The fillers are applied using a compressed-air spray gun to a zinc-phosphated steel panel coated with a cathodically deposited electrodeposition primer (about 20 μm).

The fillers are hardened in a circulating-air oven for 20 minutes at 140° C. or 160° C. or 180° C. In each case a dry-film thickness of 35±2 μm is obtained.

A commercially available alkyd resin/melamine resin automotive topcoat is applied over the filler coat and is hardened for 30 minutes at 135° C. (Dry film 35±2 μm).

The resistance properties of the films (solvent resistance, water resistance) and the mechanical values correspond, in the case of all the coatings, to the requirements of industry.

The stone-chip resistance is tested using the "SPLITT" (=Single Projectile Launching Impact-Tester). The method is described in detail in the journal FARBE+LACK, Number 8/1984. In the current test the angle of impact is 5°, and the ball diameter is 3 mm at a mass of 0.5 g. The speed of impact selected was 100 km/h. The test specimens are tested at +20° C. and at −20° C. The parameters given in the table are the (largely circular) area of damage in $mm^2$ and the coat which is exposed at the site of damage. (metal panel - M, primer - P, filler - F).

The test results are compiled in Table 4 and indicate no significant differences.

TABLE 4

| Automotive filler based on Example | | 1 | 2 | 3 | 4 | 3 of EP-A2-0330139 |
|---|---|---|---|---|---|---|
| "SPLITT" at +20° C. | 140° C. | 5–8/P | 4–6/P | 4–7/P | 4–6/P | 7–10/P |
| | 160° C. | 4–7/P/F | 2–4/P | 3–5/P/F | 1/P | 5–8/P |
| | 180° C. | 4–7/P/F | 2–4/P | 3–5/P/F | 1/P | 5–8/M/F |
| "SPLITT" at −20° C. | 140° C. | 5–8 P | 3–5/P | 3–5/P | 2–4/P | 7–10/P |
| | 160° C. | 5–8/M/P | 2–3/P | 4–5/P/F | 1/P | 6–11/M/P |
| | 180° C. | 5–8/M/P/F | 3/P | 4–5/M/P/F | 1/P | 8–12/M/P/F |

We claim:

1. Process for the preparation of water-dilutable coating binders which contain a reaction product of a polycarboxyl component with a polyhydroxyl component and contain a crosslinking component, characterized in that (A) from 10 to 80 % by weight of a polyurethane resin which contains carboxyl groups corresponding to an acid number of from 70 to 160 mg of KOH/g and contains, in the molecule, at least one terminal blocked isocyanate group but no free hydroxyl groups, and has an intrinsic viscosity of from 6.5 to 12.0 ml/g measured in N,N-dimethylformamide (DMF) at 20° C., are reacted with (B) from 20 to 90 % by weight of a polyester resin which has a hydroxyl number of from 50 to 500 mg of KOH/g, an acid number of less than 20 mg of KOH/g and an intrinsic viscosity of from 8.0 to 13.0 ml/g measured in N,N-dimethylformamide (DMF) at 20° C. at a temperature of between 90° and 170° C. up to an intrinsic viscosity of from 13.5 to 18.0 ml/g, measured in N-N-dimethyl-formamide (DMF) at 20° C., and subsequently (I) from 60 to 90 % by weight of this reaction product, before or after partial or complete neutralization of the carboxyl groups with an inorganic or organic base, are mixed at from 40° to 100° C. with (II) from 10 to 40 % by weight of a crosslinking component which is not water-dilutable, and is a blocked polyisocyanate and the mixture is diluted with water, the sums of the percentages for the composition of the combination of (A) and (B) and of (I) and (II), based on solids, being in each case 100.

2. Process according to claim 1, characterized in that the polyurethane resin employed as component (A) has been obtained by reacting a mixture of a polyisocyanate and a polyisocyanate which is partially blocked by means of monohydroxyl compounds and/or butanone oxime with a dihydroxymonocarboxylic acid, optionally with a proportion of a polyol.

3. Process according to claim 2, characterized in that the dihydroxymonocarboxylic acid employed was dimethylolpropionic acid.

4. Process according to claim 1, characterized in that the polyester resin employed as component (B) contains up to 15% by weight of residues of monocarboxylic acids having from 5 to 20 C atoms.

5. Process according to claim 1, characterized in that the proportions of components (A) and (B) are chosen so that the reaction product (I) has an acid number of at least 25 mg of KOH/g.

6. Process according to claim 1 characterized in that the proportions of components (A) and (B) are chosen so that the reaction product (I) has an acid number of from 30 to 50 mg of KOH/g.

7. Water-dilutable coating binders which contain a reaction product of a polycarboxyl component with a polyhydroxyl component and contain a crosslinking component, and are prepared according to claim 1.

8. Coating binders prepared according to claim 1 formulated into water-thinnable stoving enamels.

9. Coating binders prepared according to claim 1 formulated into water-thinnable fillers.

10. Process for the preparation of water-dilutable coating binders which contain a reaction product of a polycarboxyl component with a polyhydroxyl component and contain a crosslinking component, characterized in that (A) from 15 to 40 % by weight of a polyurethane resin which contains carboxyl groups corresponding to an acid number of from 70 to 160 mg of KOH/g and contains, in the molecule, at least one terminal blocked isocyanate group but no free hydroxyl groups and has an intrinsic viscosity of from 8.0 to 11.0 ml/g measured in N,N-dimethylformamide (DMF) at 20° C., are reacted with (B) from 60 to 85 % by weight of a polyester resin which has a hydroxyl number of from 50 to 500 mg of KOH/g, an acid number of less than 20 mg of KOH/g and an intrinsic viscosity of from 9.5 to 12.0 ml/g measured in N,N-dimethylformamide (DMF) at 20° C. at a temperature which is from 10 to 20° C. above the temperature at which the blocking agent for the terminal isocyanate groups of component (A) is split off, up to an intrinsic viscosity of from 14.5 to 16.5 ml/g, measured in N-N-dimethylformamide (DMF) at 20° C., and subsequently (I) from 60 to 90 % by weight of this reaction product, before or after partial or complete neutralization of the carboxyl groups with an inorganic or organic base, are mixed at from 40° to 100° C. with (II) from 10 to 40 % by weight of a crosslinking component which is not water-dilutable, which is a blocked polyisocyanate and the mixture is diluted with water, the sums of the percentages for the composition of the combination of (A) and (B) and of (I) and (II), based on solids, being in each case 100.

\* \* \* \* \*